June 11, 1935. W. F. PUNTE 2,004,828
METAL CONTAINER
Filed July 22, 1931
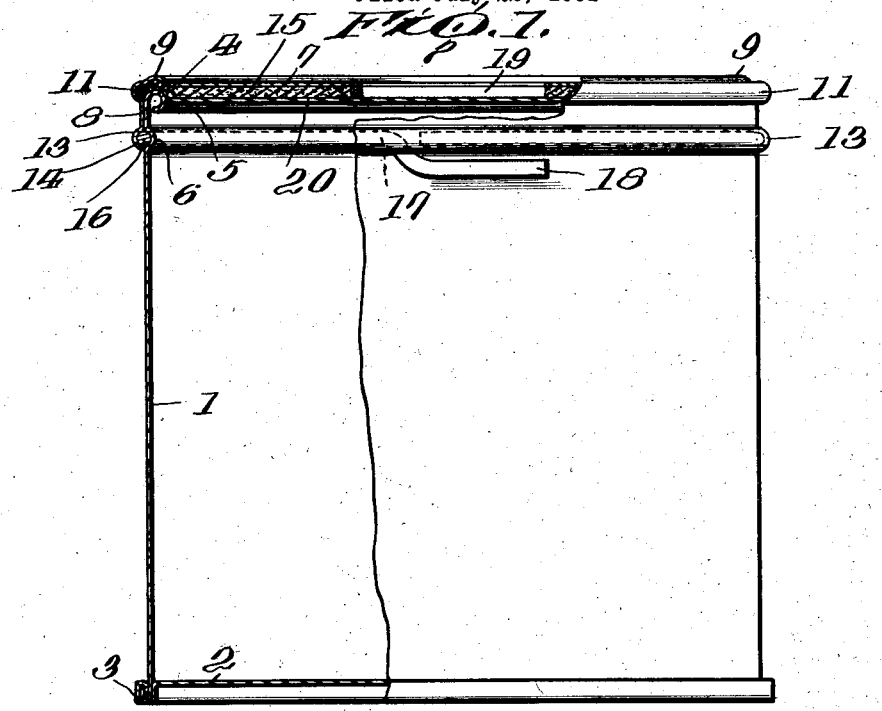
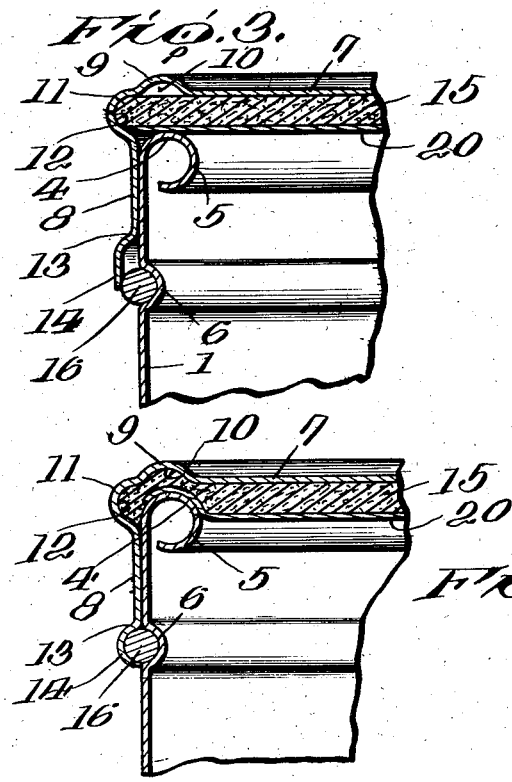
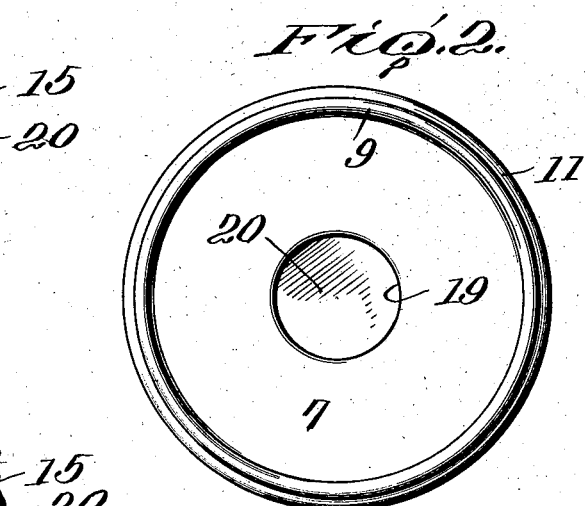
Inventor
William F. Punte
By
Sturtevant, Mason & Porter
Attorneys Patented June 11, 1935

2,004,828

UNITED STATES PATENT OFFICE 2,004,828

METAL CONTAINER

William F. Punte, Syracuse, N. Y., assignor to Continental Can Company, Inc., New York, N. Y., a corporation of New York Application July 22, 1931, Serial No. 552,514

2 Claims. (Cl. 220—47)

The invention relates to new and useful improvements in containers, and more particularly to a container which is capable of being hermetically closed and which is easily opened through the aid of a removable retaining wire.

An object of the invention is to provide a container of the above type wherein the retaining wire is placed a sufficient distance from the upper edge of the container in order to permit the cover or closure for the container to be sealed by a gasket which is forcibly clamped between parts of the cover and the container body.

A further object of the invention is to provide a container of the above type wherein the flange of the cover is turned or bent underneath a retaining wire when the cover is pressed into sealing engagement with the gasket and the container body.

A further object of the invention is to provide a container of the above type wherein the cover has an opening which is closed and sealed by a transparent panel.

In the drawing—

Figure 1 is a view partly in side elevation and partly in section showing a container embodying the improvements.

Figure 2 is a plan view of the same.

Figure 3 is an enlarged sectional view with the cover in place and before the cover is secured to the container.

Figure 4 is a similar view with the lower edge of the cover turned beneath the retaining wire for locking the cover to the container and hermetically sealing the same.

The invention is directed to a container which is hermetically sealed and which is easy to open. The container includes a body portion which is preferably cylindrical in shape. The lower end of the body is closed by a container end which is double seamed to the body. At the upper end the container body is rolled inwardly to form a relatively wide rounded bearing surface at the top edge of the bottom wall. At a distance beneath this rolled upper edge of the container body, the wall of the container body is provided with an inwardly rolled bead forming a groove in the outer face of the container body. The container body is closed by a cover having a depending flange. A retaining wire is placed in the groove in the body and the flange which has a pocket at the lower end thereof to receive the retaining wire is crimped beneath the retaining wire, and thus the cover locked in place. The cover directly over the body wall has an upwardly projecting bead forming a recess on the inner face of the cover. The cover flange has an outwardly projecting bead likewise forming a recess at the inner upper portion of the cover flange. A sealing gasket is cut into disc or ring form and is placed in the cover. This ring or gasket is of such diameter that the edge may be snapped into the recess of the flange of the cover, and this will retain the gasket in place on the cover. When the cover is forced downward onto the container the gasket will be pressed against the upper rounded edge of the body wall and will make a tight seal for the container. While the cover is pressed into sealing contact with the container the lower edge of the flange is bent or spun underneath the retaining wire. The container may be provided with a central opening, in which case there is a transparent panel of any suitable material which extends across the top of the container, and has a sealing engagement with the gasket and the upper rounded edge of the container body.

Referring more in detail to the drawing the container includes a cylindrical body 1 to which a closing body end 2 is secured by a double seam 3. The upper edge of the container body is rolled inwardly at 4 and thence downwardly at 5, thus forming a rounded upper edge for the container body. The wall of the container body is provided with an inwardly projecting bead 6 which is located some distance below the curled upper edge of the container body. The container is closed by a cover which includes a top portion 7 and a depending flange 8. The top portion 7 has an outwardly projecting annular bead 9 forming a recess 10 on its inner face. The depending flange 8 is provided with an outwardly projecting bead 11 forming a recess 12 on its inner face. The lower edge portion of the flange is curved outwardly into a quarter bead 13, and below this quarter bead 13 the flange initially is cylindrical as indicated at 14 in Figure 3 of the drawing.

Located in the cover is a sealing gasket 15. This sealing gasket is shown as in the form of a disk and is of sufficient diameter so that when placed in the cover and forced into the same the peripheral edge of the gasket will snap into the recess 12, and this will serve to retain the gasket in the cover. The gasket extends across the recess 10 in the top of the cover. When the cover is forced down onto the container the gasket will be pressed into the recess 10 and will be bent tightly about the rounded upper edge of the container wall, making intimate contact therewith practically all the way across the upper surface thereof. The gasket will also be forced down the side of the container wall and firmly clamped so that the sealing material is forced into intimate sealing contact with the cover and the container wall and in between the parts of the cover and the container wall until a very tight seal is produced. This sealing gasket may be of any desired construction. It may be pre-formed or it may be flowed onto the cover and formed thereon. It is essential, however, that it shall be of a plastic nature so that it can re-shape itself under the pressure of the cover thereagainst; and thus bring about a tight sealing of the cover to the container.

When the cover has been forced into tight sealing contact with the container the lower edge 14 of the flange or cover is bent or spun underneath a retaining wire 16, and this will hold the cover securely locked to the container body. Any upward pull of the lower edge of the cover flange is restrained by the retaining wire, and the retaining wire is firmly seated in the pocket or recess formed by the bead. There must be a bending of the parts in order to in any way release the seal of the cover to the container body. Inasmuch as the retaining wire is surrounded circumferentially, nearly 180° by the container body, and is likewise surrounded 180° by the cover flange, a very firm locking grip is obtained. Furthermore, the upper edge of the container body nests in the recess 10 on the top of the cover to a certain extent when the cover is sealed to the container body, and this will hold the body wall from any inward deflection. The ruling of the upper edge of the body wall also stiffens the same, and these two features together cooperate to make a very rigid wall in the region where the retaining wire is housed in the groove formed by the inwardly projecting bead 6. The retaining wire 16 has one end thereof bent downwardly at 17 and extended to form a handle portion 18 which may be gripped for withdrawing the retaining wire. The edge of the collar which is turned underneath the retaining wire will cross the downwardly bent portion 17 and otherwise it will be turned underneath the retaining wire substantially throughout the entire circumference of the container. The handle end 18 of the retaining wire will lie, therefore, along the outer face of the inturned lower edge portion of the flange. In order to open the container this handle end of the retaining wire is grasped and pulled downward in a direction substantially parallel with the wall of the container, and the flange of the cover will be gradually unfolded or bent outwardly releasing the retaining wire more and more until it is finally entirely released when the cover flange will then be also entirely released from its locked engagement with the container body.

As shown in the drawing, the top 9 of the cover is provided with an opening 19 therethrough which is located centrally of the cover. The gasket, which is in disk form, is also cut away throughout the extent of this opening. Placed against the under face of the gasket is a disk or panel 20, preferably of malcalite, which is transparent and which will still cover and seal the opening. The disk or panel 20 extends all the way across the container and over the top of the rounded edge of the wall of the container, so that the gasket will be firmly gripped between the cover top and this macalite disk. Inasmuch as the disk extends all the way to the opening there will be an extended seal between the cover top and the disk. This together with the tight gripping and sealing of the container in the region directly over the body wall of the container produces a very tight hermetic seal. The contents of the container can be inspected or viewed through this opening 18.

From the above it will be apparent that a container has been provided which may be hermetically closed through the aid of a cover and a sealing gasket and a retaining wire, which retaining wire may be easily removed for breaking the seal and releasing the cover.

It is obvious that minor changes in the details of construction may be made without departing from the spirit of the invention as set forth in the appended claims.

Having thus described the invention, what I claim as new and desire to secure by Letters Patent, is:—

1. A container comprising a body portion having the upper edge thereof rolled inwardly to form a hollow strengthening bead, the wall of said container being formed with an inwardly extending bead adjacent the upper end and spaced from said hollow bead, a cover end for closing said container including a top portion and an outside slip flange, said top portion having an outwardly extending bead forming a recess within the cover directly over the rolled edge on the body, a gasket between the top and the body overlying said recess, said cover flange having an outwardly extending bead conforming to the bead in the body and disposed so as to be exposed to said bead in the body when the cover is forced into tight sealing contact with the gasket, and the gasket in sealing contact with the rolled edge of the body, and a retaining wire housed within said recess formed by the beads in the cover flange and the body and operating to maintain a sealed contact between the cover, gasket and container, said retaining wire having a projecting end portion extending beneath the flange of the cover and parallel therewith and serving as a gripping means whereby said wire may be forcibly removed from beneath the flange for releasing the cover.

2. A container comprising a body portion having the upper edge thereof rolled inwardly and an inwardly extending bead spaced from said edge, a cover end including a top portion and an outside slip flange, said top portion having an outwardly extending bead forming a recess within the cover and directly over the rolled edge on the body, a gasket between the top and body overlying the recess, said cover flange when sealed to the body having an outwardly extending bead conforming to and opposite the bead in the body, and a retaining wire housed within the recesses formed by the beads in the cover flange and the body and operating to hold said cover in tight sealing contact with the gasket and rolled edge of the body, said top portion having a central opening therethrough, said gasket extending all the way from said opening to the outer edge of the top portion and a transparent panel contacting with the gasket and covering said opening, said panel being extended so as to overlie the rolled edge of the body and be clamped thereagainst when the cover is attached to the body.

WM. F. PUNTE.